US012806963B2

(12) United States Patent
Chen et al.

(10) Patent No.: US 12,806,963 B2
(45) Date of Patent: Nov. 24, 2026

(54) VEHICLE THERMAL MANAGEMENT SYSTEM AND TRANSPORTATION REFRIGERATION VEHICLE

(71) Applicant: Carrier Corporation, Palm, FL (US)

(72) Inventors: Kun Chen, Shanghai (CN); Hai Tian, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 147 days.

(21) Appl. No.: 18/770,629

(22) Filed: Jul. 11, 2024

(65) Prior Publication Data

US 2025/0026177 A1 Jan. 23, 2025

(30) Foreign Application Priority Data

Jul. 17, 2023 (CN) ........................ 202310877005.1

(51) Int. Cl.
*B60H 1/00* (2006.01)

(52) U.S. Cl.
CPC ..... *B60H 1/00885* (2013.01); *B60H 1/00278* (2013.01); *B60H 1/00485* (2013.01)

(58) Field of Classification Search
CPC ............ B60H 1/00885; B60H 1/00278; B60H 1/00485; B60H 1/00921; B60H 1/00642; B60H 1/3205; B60H 2001/00307; B60H 2001/00928
See application file for complete search history.

(56) References Cited

U.S. PATENT DOCUMENTS

| | | | | |
|---|---|---|---|---|
| 2011/0072841 A1* | 3/2011 | Arai | B60L 58/27 62/513 |
| 2011/0113800 A1* | 5/2011 | Sekiya | B60L 1/02 62/430 |
| 2013/0299129 A1* | 11/2013 | Osaka | B60H 1/32281 165/59 |
| 2020/0122544 A1* | 4/2020 | Ishizeki | B60H 1/143 |
| 2021/0031588 A1* | 2/2021 | Yahia | F25B 49/02 |

FOREIGN PATENT DOCUMENTS

| | | |
|---|---|---|
| CN | 101574923 A | 11/2009 |
| CN | 103129348 A | 7/2013 |
| CN | 103496319 A | 1/2014 |
| CN | 103855440 A | 6/2014 |

(Continued)

OTHER PUBLICATIONS

Extended European Search Report received for EP Application No. 24189007.8, mailed on Jan. 10, 2025, 7 Pages.

*Primary Examiner* — Marc E Norman
(74) *Attorney, Agent, or Firm* — Andrew Goldberg

(57) ABSTRACT

The present application provides a vehicle thermal management system and a transportation refrigeration vehicle. The vehicle thermal management system comprises: an air conditioning system, configured with a compressor, a first three-way valve, a first outdoor heat exchanger, an indoor heat exchanger, a regulating valve, an intermediate heat exchanger, and a first throttling element, a second throttling element, and a third throttling element connected through pipelines, and a battery cooling system, configured with a second outdoor heat exchanger, a battery cooling device, and a second three-way valve connected through pipelines.

20 Claims, 2 Drawing Sheets

(56) References Cited

FOREIGN PATENT DOCUMENTS

| | | | |
|---|---|---|---|
| CN | 203727131 | U | 7/2014 |
| CN | 107394311 | A | 11/2017 |
| CN | 107565191 | A | 1/2018 |
| CN | 110103665 | A | 8/2019 |
| CN | 111267578 | A | 6/2020 |
| CN | 112339522 | A | 2/2021 |
| CN | 116278596 | A | 6/2023 |
| CN | 116373531 | A | 7/2023 |
| FR | 2884058 | A1 | 10/2006 |
| JP | 2002352866 | A | 12/2002 |
| JP | 2007069733 | A | 3/2007 |
| JP | 2013001160 | A | 1/2013 |
| JP | 2013184592 | A | 9/2013 |
| WO | 2012118015 | A1 | 9/2012 |
| WO | 2019235414 | A1 | 12/2019 |

* cited by examiner

VEHICLE THERMAL MANAGEMENT SYSTEM AND TRANSPORTATION REFRIGERATION VEHICLE

CROSS REFERENCE TO A RELATED APPLICATION

The application claims the benefit of China Patent Application No. 202310877005.1 filed Jul. 17, 2023, the contents of which are hereby incorporated in their entirety

FIELD OF THE INVENTION

The present invention relates to the field of temperature regulation in transportation vehicles, in particular to a vehicle thermal management system and a transportation refrigeration vehicle.

BACKGROUND OF THE INVENTION

In new energy electric vehicles or hybrid electric vehicles, the power battery plays an important role as an energy carrier for the normal operation of new energy electric vehicles or hybrid electric vehicles. The output power, service life and other performance of the power battery are closely related to the performance and service life of the vehicle.

The power battery must be within a certain temperature range during operation to achieve optimal performance and ensure energy output. Under high temperature conditions, due to the high operating current of the power battery, a large amount of heat is generated. At the same time, the power battery is a relatively closed environment. If the heat is not dissipated in time, it will lead to thermal runaway, shortened lifespan, and damage to the power battery. Therefore, it is necessary to cool the power battery during operation.

SUMMARY OF THE INVENTION

The present invention aims to provide a vehicle thermal management system and a transportation refrigeration vehicle to at least partially solve or alleviate the problems existing in the prior art.

To achieve at least one object of the present invention, according to one aspect of the present invention, a vehicle thermal management system is provided, comprising:

an air conditioning system, configured with a compressor, a first three-way valve, a first outdoor heat exchanger, an indoor heat exchanger, a regulating valve, an intermediate heat exchanger, and a first throttling element, a second throttling element, and a third throttling element with a shut-off function connected through pipelines, wherein, the first three-way valve has a first port for communicating with an exhaust port of the compressor, a second port for communicating with a first end of the first outdoor heat exchanger, and a third port for communicating with a first end of the indoor heat exchanger; a second end of the first outdoor heat exchanger is connected to the first end of the indoor heat exchanger through the first throttling element, and at the same time, the second end of the first outdoor heat exchanger is connected to a suction port of the compressor through the second throttling element and the intermediate heat exchanger; a second end of the indoor heat exchanger is connected to the suction port of the compressor through the regulating valve, and at the same time, the second end of the indoor heat exchanger is connected to the suction port of the compressor through the third throttling element and the intermediate heat exchanger; and a battery cooling system, configured with a second outdoor heat exchanger, a battery cooling device, and a second three-way valve connected through pipelines, wherein, the second three-way valve has a first port for communicating with an outlet of the battery cooling device, a second port for communicating with the intermediate heat exchanger, and a third port for communicating with a first end of the second outdoor heat exchanger; an inlet of the battery cooling device and a second end of the second outdoor heat exchanger are simultaneously connected to the intermediate heat exchanger.

In addition to one or more of the above features, or as an alternative, in other embodiments, the regulating valve is a stepless regulating valve.

In addition to one or more of the above features, or as an alternative, in other embodiments, the vehicle thermal management system comprises a controller that communicates with the regulating valve, the first throttling element, the second throttling element, the third throttling element, or any combination thereof.

In addition to one or more of the above features, or as an alternative, in other embodiments, the vehicle thermal management system comprises: a compartment cooling and battery cooling mode, wherein, the controller instructs to turn on the first throttling element, the second throttling element, the first port and second port of the first three-way valve, and the regulating valve, and to turn off the third throttling element, the third port of the first three-way valve, so that the first throttling element and the second throttling element play a throttling role, thereby allowing a first part of the refrigerant of the air conditioning system to sequentially flow through the exhaust port of the compressor, the first port of the first three-way valve, the second port of the first three-way valve, the first outdoor heat exchanger, the first throttling element, the indoor heat exchanger, the regulating valve and the suction port of the compressor, and at the same time allowing a second part of the refrigerant of the air conditioning system to sequentially flow through the exhaust port of the compressor, the first port of the first three-way valve, the second port of the first three-way valve, the first outdoor heat exchanger, the second throttling element, the intermediate heat exchanger, and the suction port of the compressor; and the controller instructs to turn on the first port and second port of the second three-way valve, and to turn off the third port of the second three-way valve, so that the coolant of the battery cooling system sequentially flows through the outlet of the battery cooling device, the first port of the second three-way valve, the second port of the second three-way valve, the intermediate heat exchanger, and the inlet of the battery cooling device.

In addition to one or more of the above features, or as an alternative, in other embodiments, the vehicle thermal management system comprises: a compartment heating and battery cooling mode, wherein, the controller instructs to turn on the third throttling element, the first port and third port of the first three-way valve, and to turn off the first throttling element, the second throttling element, the second port of the first three-way valve, and the regulating valve, so that the third throttling element plays a throttling role, thereby allowing the refrigerant of the air conditioning system to sequentially flow through the exhaust port of the compressor, the first port of the first three-way valve, the third port of the first three-way valve, the indoor heat exchanger, the third throttling element, the intermediate heat exchanger, and the suction port of the compressor; and the controller instructs to turn on the first port and second port of the second three-way valve, and to turn off the third port of the second three-way valve, so that the coolant of the battery cooling system sequentially flows through the outlet of the battery cooling device, the first port of the second three-way valve, the second port of the second three-way valve, the intermediate heat exchanger, and the inlet of the battery cooling device.

In addition to one or more of the above features, or as an alternative, in other embodiments, the vehicle thermal management system comprises: a compartment cooling and battery natural cooling mode, wherein, the controller instructs to turn on the first throttling element, the first port and second port of the first three-way valve, and the regulating valve, and to turn off the second throttling element, the third throttling element, and the third port of the first three-way valve, so that the first throttling element plays a throttling role, thereby allowing the refrigerant of the air conditioning system to sequentially flow through the exhaust port of the compressor, the first port of the first three-way valve, the second port of the first three-way valve, the first outdoor heat exchanger, the first throttling element, the indoor heat exchanger, the regulating valve and the suction port of the compressor; and the controller instructs to turn on the first port and the third port of the second three-way valve, and to turn off the second port of the second three-way valve, so that the coolant of the battery cooling system sequentially flows through the outlet of the battery cooling device, the first port of the second three-way valve, the third port of the second three-way valve, the second outdoor heat exchanger, and the inlet of the battery cooling device.

To achieve at least one object of the present invention, according to another aspect of the present invention, a vehicle thermal management system is provided, comprising:

an air conditioning system, configured with a compressor, a first three-way valve, a first outdoor heat exchanger, an indoor heat exchanger, a regulating valve, an intermediate heat exchanger, a first one-way valve, a second one-way valve, and a first throttling element and a second throttling element with a shut-off function connected through pipelines, wherein, the first three-way valve has a first port for communicating with an exhaust port of the compressor, a second port for communicating with a first end of the first outdoor heat exchanger, and a third port for communicating with a first end of the indoor heat exchanger; a second end of the first outdoor heat exchanger is connected to the first end of the indoor heat exchanger through the first throttling element, and at the same time, the second end of the first outdoor heat exchanger is connected to a suction port of the compressor through the first one-way valve, the second throttling element, and the intermediate heat exchanger; a second end of the indoor heat exchanger is connected to the suction port of the compressor through the regulating valve, and at the same time, the second end of the indoor heat exchanger is connected to the suction port of the compressor through the second one-way valve, the second throttling element, and the intermediate heat exchanger; and a battery cooling system, configured with a second outdoor heat exchanger, a battery cooling device, and a second three-way valve connected through pipelines, wherein, the second three-way valve has a first port for communicating with an outlet of the battery cooling device, a second port for communicating with the intermediate heat exchanger, and a third port for communicating with a first end of the second outdoor heat exchanger; an inlet of the battery cooling device and a second end of the second outdoor heat exchanger are simultaneously connected to the intermediate heat exchanger.

In addition to one or more of the above features, or as an alternative, in other embodiments, the regulating valve is a stepless regulating valve.

In addition to one or more of the above features, or as an alternative, in other embodiments, the vehicle thermal management system comprises a controller that communicates with the regulating valve, the first throttling element, the second throttling element, or any combination thereof.

In addition to one or more of the above features, or as an alternative, in other embodiments, the vehicle thermal management system comprises: a compartment cooling and battery cooling mode, wherein, the controller instructs to turn on the first throttling element, the second throttling element, the first port and second port of the first three-way valve, and the regulating valve, and to turn off the third port of the first three-way valve, so that the first throttling element and the second throttling element play a throttling role, thereby allowing a first part of the refrigerant of the air conditioning system to sequentially flow through the exhaust port of the compressor, the first port of the first three-way valve, the second port of the first three-way valve, the first outdoor heat exchanger, the first throttling element, the indoor heat exchanger, the regulating valve, and the suction port of the compressor, and at the same time allowing a second part of the refrigerant of the air conditioning system to sequentially flow through the exhaust port of the compressor, the first port of the first three-way valve, the second port of the first three-way valve, the first outdoor heat exchanger, the first one-way valve, the second throttling element, the intermediate heat exchanger, and the suction port of the compressor; and the controller instructs to turn on the first port and second port of the second three-way valve, and to turn off the third port of the second three-way valve, so that the coolant of the battery cooling system sequentially flows through the outlet of the battery cooling device, the first port of the second three-way valve, the second port of the second three-way valve, the intermediate heat exchanger, and the inlet of the battery cooling device.

In addition to one or more of the above features, or as an alternative, in other embodiments, the vehicle thermal management system comprises: a compartment heating and battery cooling mode, wherein, the controller instructs to turn on the second throttling element, the first port and third port of the first three-way valve, and to turn off the first throttling element, the second port of the first three-way valve, and the regulating valve, so that the second throttling element plays a throttling role, thereby allowing the refrigerant of the air conditioning system to sequentially flow through the exhaust port of the compressor, the first port of the first three-way valve, the third port of the first three-way valve, the indoor heat exchanger, the second one-way valve, the second throttling element, the intermediate heat exchanger, and the suction port of the compressor; and the controller instructs to turn on the first port and the second port of the second three-way valve, and to turn off the third port of the second three-way valve, so that the coolant of the battery cooling system sequentially flows through the outlet of the battery cooling device, the first port of the second three-way valve, the second port of the second three-way valve, the intermediate heat exchanger, and the inlet of the battery cooling device.

In addition to one or more of the above features, or as an alternative, in other embodiments, the vehicle thermal management system comprises: a compartment cooling and battery natural cooling mode, wherein, the controller instructs to turn on the first throttling element, the first port and second port of the first three-way valve, and the regulating valve, and to turn off the second throttling element, and the third port of the first three-way valve, so that the first throttling element plays a throttling role, thereby allowing the refrigerant of the air conditioning system to sequentially flow through the exhaust port of the compressor, the first port of the first three-way valve, the second port of the first three-way valve, the first outdoor heat exchanger, the first throttling element, the indoor heat exchanger, the regulating valve and the suction port of the compressor; and the controller instructs to turn on the first port and third port of the second three-way valve, and to turn off the second port of the second three-way valve, so that the coolant of the battery cooling system sequentially flows through the outlet of the battery cooling device, the first port of the second three-way valve, the third port of the second three-way valve, the second outdoor heat exchanger, and the inlet of the battery cooling device.

To achieve at least one object of the present invention, according to another aspect of the present invention, a transport refrigeration vehicle is provided, comprising the aforementioned vehicle thermal management system.

It can be appreciated that the vehicle thermal management system according to the present invention can not only cool the vehicle battery when the air conditioning system is in a cooling mode, but also cool the vehicle battery when the air conditioning system is in a heating mode, without affecting the independent cooling function of the vehicle battery, which is conducive to ensuring that the vehicle battery is always within the appropriate temperature range during operation.

BRIEF DESCRIPTION OF THE DRAWINGS

The disclosure of the present invention will become easier to understand by referring to the accompanying drawings. It is easy for those skilled in the art to understand that these drawings are only for illustrative purposes and are not intended to limit the scope of protection of the present invention. In addition, similar numbers in the figures are used to denote similar components, where.

DETAILED DESCRIPTION OF EMBODIMENT(S) OF THE INVENTION

The present application will be described in detail hereinafter with reference to the exemplary embodiments shown in the accompanying drawings. However, it should be understood that the present application can be implemented in many different forms, and should not be construed as being limited to the embodiments set forth herein. These embodiments are provided here for the purpose of making the disclosure of the present application more complete and comprehensive, and fully conveying the concept of the present application to those skilled in the art.

Figure 1:
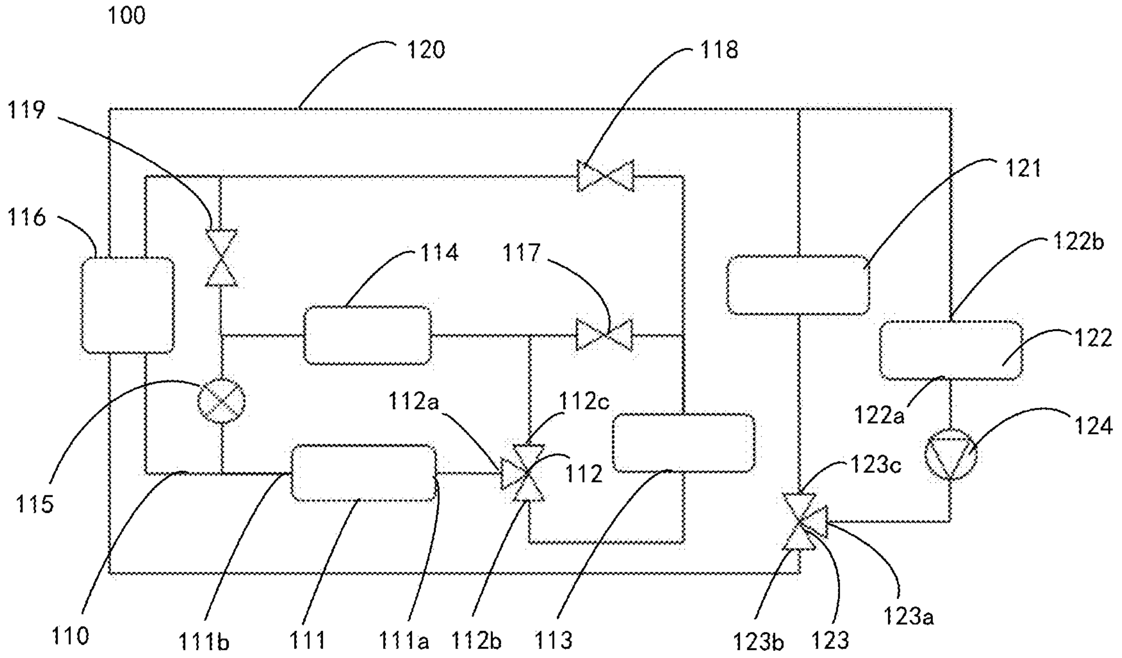
FIG. 1 shows a structural schematic diagram of a first embodiment of a vehicle thermal management system according to the present invention.

Referring to FIG. 1, an embodiment of a vehicle thermal management system is illustrated. The vehicle thermal management system 100 comprises an air conditioning system 110 and a battery cooling system 120. When taking a transportation vehicle as an example, the air conditioning system 110 is mainly used for cooling or heating the respective compartments for storage of goods or of the driver's cabin, while the battery cooling system 120 is mainly used for cooling the vehicle battery.

Specifically, the air conditioning system 110 is configured with a compressor 111, a first three-way valve 112, a first outdoor heat exchanger 113, an indoor heat exchanger 114, a regulating valve 115, an intermediate heat exchanger 116, and a first throttling element 117, a second throttling element 118, and a third throttling element 119 with a shut-off function connected through pipelines. The first three-way valve 112 has a first port 112*a* for communicating with an exhaust port 111*a* of the compressor 111, a second port 112*b* for communicating with a first end of the first outdoor heat exchanger 113, and a third port 112*c* for communicating with the first end of the indoor heat exchanger 114. The second end of the first outdoor heat exchanger 113 is connected to the first end of the indoor heat exchanger 114 through the first throttling element 117, and at the same time the second end of the first outdoor heat exchanger 113 is connected to the suction port 111*b* of the compressor 111 through the second throttling element 118 and the intermediate heat exchanger 116. The second end of the indoor heat exchanger 114 is connected to the suction port 111*b* of the compressor 111 through the regulating valve 115, and at the same time the second end of the indoor heat exchanger 114 is connected to the suction port 111*b* of the compressor 111 through the third throttling element 119 and the intermediate heat exchanger 116.

The battery cooling system 120 is configured with a second outdoor heat exchanger 121, a battery cooling device 122, and a second three-way valve 123 connected through pipelines. Wherein, the second three-way valve 123 has a first port 123*a* for communicating with the outlet 122*a* of the battery cooling device 122, a second port 123*b* for communicating with the intermediate heat exchanger 116, and a third port 123*c* for communicating with the first end of the second outdoor heat exchanger 121. The inlet 122*b* of the battery cooling device 122 and the second end of the second outdoor heat exchanger 121 are simultaneously connected to the intermediate heat exchanger 116.

The vehicle thermal management system 100 with such an arrangement achieves heat exchange between the refrigerant of the air conditioning system 110 and the coolant of the battery cooling system 120 through an intermediate heat exchanger 116, allowing the air conditioning system 110 to cool the vehicle battery while cooling and heating.

Various possible modifications of the vehicle thermal management system will be described below in conjunction with the appended drawings. In addition, for the purpose of further improving system energy efficiency or reliability etc., additional components can be added, as will also be exemplarily illustrated below. For example, the regulating valve 115 is a stepless regulating valve. For another example, the vehicle thermal management system 100 further comprises a controller (not shown) that communicates with the regulating valve 115, the first throttling element

117, the second throttling element 118, the third throttling element 119, or any combination thereof. For yet another example, the battery cooling system 120 is equipped with a pumping device 124 for providing power to the coolant.

The vehicle thermal management system 100 can achieve the compartment cooling and battery cooling mode. An illustrative example will be described below in conjunction with FIG. 1.

With continued reference to FIG. 1, specifically, when executing the compartment cooling and battery cooling mode, the controller instructs to turn on the first throttling element 117, the second throttling element 118, the first port 112*a* and second port 112*b* of the first three-way valve 112, and the regulating valve 115, and to turn off the third throttling element 119, and the third port 112*c* of the first three-way valve 112, so that the first throttling element 117 and the second throttling element 118 play a throttling role; and the controller instructs to turn on the first port 123*a* and second port 123*b* of the second three-way valve 123, and to turn off the third port 123*c* of the second three-way valve 123.

On the air conditioning system side, the refrigerant of the air conditioning system 110 first enters the compressor 111 to achieve gas-phase compression. Then, the first part of the refrigerant flows from the exhaust port 111*a* of the compressor 111 through the first port 112*a* of the first three-way valve 112 and the second port 112*b* of the first three-way valve 112 into the first outdoor heat exchanger 113 for condensation and heat dissipation. The refrigerant then flows through the first throttling element 117 into the indoor heat exchanger 114, where the refrigerant can enter the indoor heat exchanger 114 for evaporation and heat absorption after undergoing throttling expansion in the first throttling element 117, thereby providing cooling for the compartment. When the refrigerant returns to the suction port 111*b* of the compressor 111 after passing through the regulating valve 115, the cycle is completed.

Meanwhile, the second part of the refrigerant flows from the exhaust port 111*a* of the compressor 111 through the first port 112*a* of the first three-way valve 112 and the second port 112*b* of the first three-way valve 112 into the first outdoor heat exchanger 113 for condensation and heat dissipation. The refrigerant then flows through the second throttling element 118 into the intermediate heat exchanger 116, where the refrigerant can enter the intermediate heat exchanger 116 after undergoing throttling expansion in the second throttling element 118, thereby achieving heat exchange between the refrigerant and the coolant of the battery cooling system 120. When the refrigerant exchanges heat with the coolant of the battery cooling system 120 and then returns to the suction port 111*b* of the compressor 111, the cycle is completed.

On the battery cooling system side, the coolant of the battery cooling system 120 flows from the outlet 122*a* of the battery cooling device 122 through the first port 123*a* of the second three-way valve 123 and the second port 123*b* of the second three-way valve 123 into the intermediate heat exchanger 116, thereby achieving heat exchange between the coolant and the refrigerant of the air conditioning system 110, thus further reducing the temperature of the coolant. Subsequently, the coolant that has undergone heat exchange returns to the inlet 122*b* of the battery cooling device 122, thereby cooling the battery cooling device 122, thus completing the cycle.

It should be noted that the first throttling element 117, the second throttling element 118, and the third throttling element 119 can all play a role in throttling expansion. However, two of them can also be made to be completely turned off, while the remaining one can regulate its opening to play a role in throttling expansion.

For example, the vehicle thermal management system 100 can also achieve a compartment heating and battery cooling mode. An illustrative example will be described below in conjunction with FIG. 1.

With continued reference to FIG. 1, specifically, when executing the compartment heating and battery cooling mode, the controller instructs to turn on the third throttling element 119, the first port 112*a* and third port 112*c* of the first three-way valve 112, and to turn off the first throttling element 117, the second throttling element 118, the second port 112*b* of the first three-way valve 112, and the regulating valve 115, so that the third throttling element 119 plays a throttling role; and the controller instructs to turn on the first port 123*a* and second port 123*b* of the second three-way valve 123, and to turn off the third port 123*c* of the second three-way valve 123.

On the air conditioning system side, the refrigerant of the air conditioning system 110 first enters the compressor 111 to achieve gas-phase compression. Then, the refrigerant flows from the exhaust port 111*a* of the compressor 111 through the first port 112*a* of the first three-way valve 112 and the third port 112*c* of the first three-way valve 112 into the indoor heat exchanger 114 for condensation and heat dissipation, thereby providing heating for the compartment. The refrigerant then flows through the third throttling element 119 into the intermediate heat exchanger 116, where the refrigerant can enter the intermediate heat exchanger 116 after undergoing throttling expansion in the third throttling element 119, thereby achieving heat exchange between the refrigerant and the coolant of the battery cooling system 120. When the refrigerant exchanges heat with the coolant of the battery cooling system 120 and then returns to the suction port 111*b* of the compressor 111, the cycle is completed.

On the battery cooling system side, the coolant of the battery cooling system 120 flows from the outlet 122*a* of the battery cooling device 122 through the first port 123*a* of the second three-way valve 123 and the second port 123*b* of the second three-way valve 123 into the intermediate heat exchanger 116, thereby achieving heat exchange between the coolant and the refrigerant of the air conditioning system 110, thus further reducing the temperature of the coolant. Subsequently, the coolant that has undergone heat exchange returns to the inlet 122*b* of the battery cooling device 122, so as to cool the battery cooling device 122, thus completing the cycle.

For example, the vehicle thermal management system 100 can also achieve compartment cooling and battery natural cooling mode. An illustrative example will be described below in conjunction with FIG. 1.

With continued reference to FIG. 1, specifically, when executing the compartment cooling and battery natural cooling mode, the controller instructs to turn on the first throttling element 117, the first port 112*a* and second port 112*b* of the first three-way valve 112, and the regulating valve 115, and to turn off the second throttling element 118, the third throttling element 119, and the third port 112*c* of the first three-way valve 112, so that the first throttling element 117 plays a throttling role; and the controller instructs to turn on the first port 123*a* and third port 123*c* of the second three-way valve 123, and to turn off the second port 123*b* of the second three-way valve 123.

On the air conditioning system side, the refrigerant of the air conditioning system 110 first enters the compressor 111 to achieve gas-phase compression. Then, the refrigerant flows from the exhaust port 111*a* of the compressor 111 through the first port 112*a* of the first three-way valve 112 and the second port 112*b* of the first three-way valve 112 into the first outdoor heat exchanger 113 for condensation and heat dissipation. The refrigerant then flows through the first throttling element 117 into the indoor heat exchanger 114, where the refrigerant can enter the indoor heat exchanger 114 for evaporation and heat absorption after undergoing throttling expansion in the first throttling element 117, thereby providing cooling for the compartment. When the refrigerant returns to the suction port 111*b* of the compressor 111 after passing through the regulating valve 115, the cycle is completed.

On the battery cooling system side, the coolant of the battery cooling system 120 flows from the outlet 122*a* of the battery cooling device 122 through the first port 123*a* of the second three-way valve 123 and the third port 123*c* of the second three-way valve 123, and enters the second outdoor heat exchanger 121, thereby exchanging heat between the coolant and the air through air cooling and other means, thus further reducing the temperature of the coolant. Subsequently, the coolant that has undergone heat exchange returns to the inlet 122*b* of the battery cooling device 122, thereby cooling the battery cooling device 122, thus completing the cycle.

Figure 2:
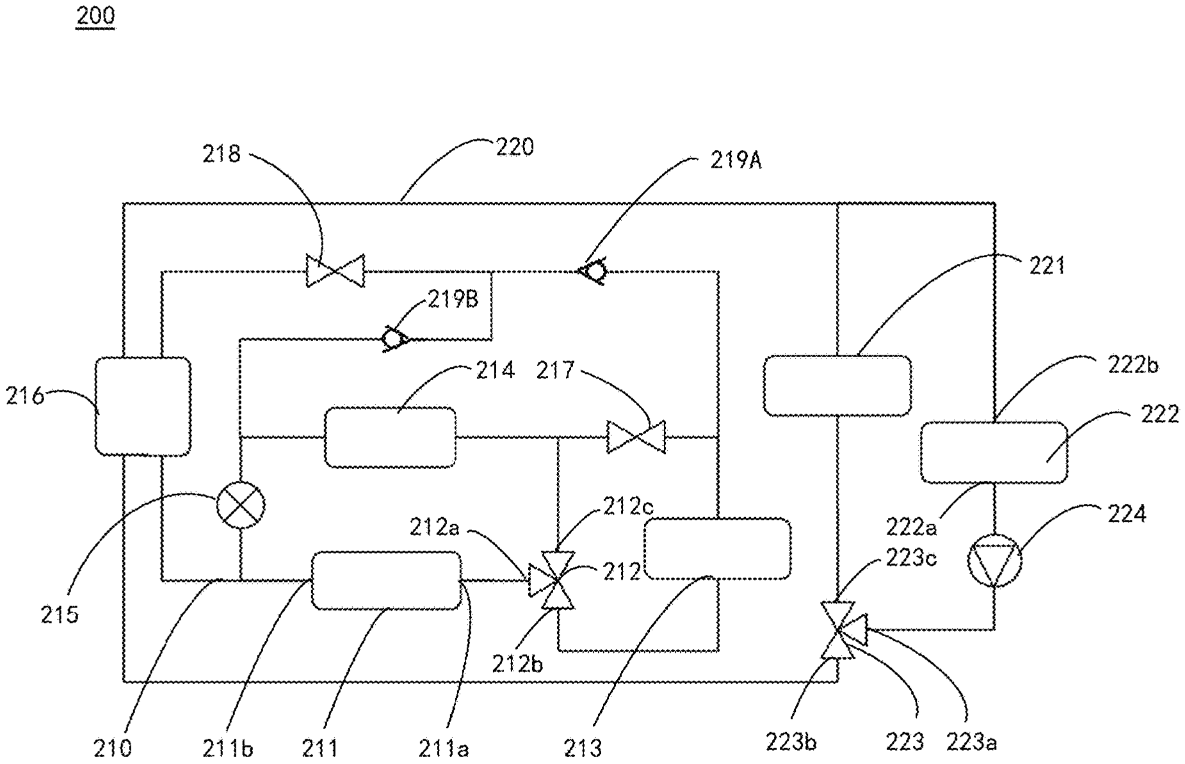
FIG. 2 shows a structural schematic diagram of a second embodiment of a vehicle thermal management system according to the present invention.

Referring to FIG. 2, another embodiment of a vehicle thermal management system is illustrated. The vehicle thermal management system 200 comprises an air conditioning system 210 and a battery cooling system 220. The functions and principles of the air conditioning system 210 and the battery cooling system 220 in the embodiment shown in FIG. 2 can refer to the aforementioned embodiment, and will not be repeated here.

Specifically, the air conditioning system 210 is configured with a compressor 211, a first three-way valve 212, a first outdoor heat exchanger 213, an indoor heat exchanger 214, a regulating valve 215, an intermediate heat exchanger 216, a first throttling element 217 and a second throttling element 218 with a shut-off function, a first one-way valve 219A, and a second one-way valve 219B connected through pipelines. The first three-way valve 212 has a first port 212*a* for communicating with the exhaust port 211*a* of the compressor 211, a second port 212*b* for communicating with the first end of the first outdoor heat exchanger 213, and a third port 212*c* for communicating with the first end of the indoor heat exchanger 214. The second end of the first outdoor heat exchanger 213 is connected to the first end of the indoor heat exchanger 214 through the first throttling element 217, and at the same time, the second end of the first outdoor heat exchanger 213 is connected to the suction port 211*b* of the compressor 211 through the first one-way valve 219A, the second throttling element 218, and the intermediate heat exchanger 216. The second end of the indoor heat exchanger 214 is connected to the suction port 211*b* of the compressor 211 through the regulating valve 215, and at the same time, the second end of the indoor heat exchanger 214 is connected to the suction port 211*b* of the compressor 211 through the second one-way valve 219B, the second throttling element 218, and the intermediate heat exchanger 216.

The battery cooling system 220 is configured with a second outdoor heat exchanger 221, a battery cooling device 222, and a second three-way valve 223 connected through pipelines, wherein, the second three-way valve 223 has a first port 223*a* for communicating with the outlet 222*a* of the battery cooling device 222, a second port 223*b* for communicating with the intermediate heat exchanger 216, and a third port 223*c* for communicating with the first end of the second outdoor heat exchanger 221. The inlet 222*b* of the battery cooling device 222 and the second end of the second outdoor heat exchanger 221 are simultaneously connected to the intermediate heat exchanger 216.

The vehicle thermal management system 200 with such an arrangement achieves heat exchange between the refrigerant of the air conditioning system 210 and the coolant of the battery cooling system 220 through an intermediate heat exchanger 216, allowing the air conditioning system 210 to cool the vehicle battery while cooling and heating.

Various possible modifications of the vehicle thermal management system will be described below in conjunction with the appended drawings. In addition, for the purpose of further improving system energy efficiency or reliability, additional components can be added, as will also be exemplarily illustrated below. For example, the regulating valve 215 is a stepless regulating valve. For another example, the vehicle thermal management system 200 further comprises a controller (not shown) that communicates with the regulating valve 215, the first throttling element 217, the second throttling element 218, or any combination thereof. For yet another example, the battery cooling system 220 is configured with a pumping device 224 for providing power to the coolant.

The vehicle thermal management system 200 can achieve the compartment cooling and battery cooling mode. An illustrative example will be described below in conjunction with FIG. 2.

With continued reference to FIG. 2, specifically, when executing the compartment cooling and battery cooling mode, the controller instructs to turn on the first throttling element 217, the second throttling element 218, the first port 212*a* and second port 212*b* of the first three-way valve 212, the regulating valve 215, and to turn off the third port 212*c* of the first three-way valve 212, so that the first throttling element 217 and the second throttling element 218 play a throttling role; and the controller instructs to turn on the first port 223*a* and second port 223*b* of the second three-way valve 223, and to turn off the third port 223*c* of the second three-way valve 223.

On the air conditioning system side, the refrigerant of the air conditioning system 210 first enters the compressor 211 to achieve gas-phase compression. Then, the first part of the refrigerant flows from the exhaust port 211*a* of the compressor 211 through the first port 212*a* of the first three-way valve 212 and the second port 212*b* of the first three-way valve 212 into the first outdoor heat exchanger 213 for condensation and heat dissipation. The refrigerant then flows through the first throttling element 217 into the indoor heat exchanger 214, where the refrigerant can enter the indoor heat exchanger 214 for evaporation and heat absorption after undergoing throttling expansion in the first throttling element 217, thereby providing cooling for the compartment. When the refrigerant returns to the suction port 211*b* of the compressor 211 after passing through the regulating valve 215, the cycle is completed.

Meanwhile, the second part of the refrigerant flows from the exhaust port 211*a* of the compressor 211 through the first port 212*a* of the first three-way valve 212 and the second port 212*b* of the first three-way valve 212 into the first outdoor heat exchanger 213 for condensation and heat dissipation. The refrigerant then flows through the first one-way valve 219A into the second throttling element 218, and can enter the intermediate heat exchanger 216 after undergoing throttling expansion in the second throttling element 218, thereby achieving heat exchange between the refrigerant and the coolant of the battery cooling system 220.

When the refrigerant exchanges heat with the coolant of the battery cooling system 220 and then returns to the suction port 211*b* of the compressor 211, the cycle is completed.

On the battery cooling system side, the coolant of the battery cooling system 220 flows from the outlet 222*a* of the battery cooling device 222 through the first port 223*a* of the second three-way valve 223 and the second port 223*b* of the second three-way valve 223 into the intermediate heat exchanger 216, thereby exchanging heat with the refrigerant of the air conditioning system 210, thus further reducing the temperature of the coolant. Subsequently, the coolant that has undergone heat exchange returns to the inlet 222*b* of the battery cooling device 222, thereby cooling the battery cooling device 222, thus completing the cycle.

It should be noted that both the first throttling element 217 and the second throttling element 218 can play a role in throttling expansion. However, one of them can also be completely turned off, while the other can regulate its opening to play a role in throttling expansion.

For example, the vehicle thermal management system 200 can also achieve a compartment heating and battery cooling mode. An illustrative example will be described below in conjunction with FIG. 2.

With continued reference to FIG. 2, specifically, when executing the compartment heating and battery cooling mode, the controller instructs to turn on the second throttling element 218, the first port 212*a* and third port 212*c* of the first three-way valve 212, and to turn off the first throttling element 217, the second port 212*b* of the first three-way valve 212, and the regulating valve 215, so that the second throttling element 218 plays a throttling role; and the controller instructs to turn on the first port 223*a* and second port 223*b* of the second three-way valve 223, and to turn off the third port 223*c* of the second three-way valve 223.

On the air conditioning system side, the refrigerant of the air conditioning system 210 first enters the compressor 211 to achieve gas-phase compression. Then, the refrigerant flows from the exhaust port 211*a* of the compressor 211 through the first port 212*a* of the first three-way valve 212 and the third port 212*c* of the first three-way valve 212 into the indoor heat exchanger 214 for condensation and heat dissipation, thereby providing heating for the compartment. The refrigerant then flows through the second one-way valve 219B and the second throttling element 218 into the intermediate heat exchanger 216, where the refrigerant can enter the intermediate heat exchanger 216 after undergoing throttling expansion in the second throttling element 218, thereby achieving heat exchange between the refrigerant and the coolant of the battery cooling system 220. When the refrigerant exchanges heat with the coolant of the battery cooling system 220 and then returns to the suction port 211*b* of the compressor 211, the cycle is completed.

On the battery cooling system side, the coolant of the battery cooling system 220 flows from the outlet 222*a* of the battery cooling device 222 through the first port 223*a* of the second three-way valve 223 and the second port 223*b* of the second three-way valve 223 into the intermediate heat exchanger 216, thereby achieving heat exchange between the coolant and the refrigerant of the air conditioning system 210, thus further reducing the temperature of the coolant. Subsequently, the coolant that has undergone heat exchange returns to the inlet 222*b* of the battery cooling device 222, thereby cooling the battery cooling device 222, thus completing the cycle.

For still another example, the vehicle thermal management system 200 can also achieve a compartment cooling and battery natural cooling mode. An illustrative example will be described below in conjunction with FIG. 2.

With continued reference to FIG. 2, specifically, when executing the compartment cooling and battery natural cooling mode, the controller instructs to turn on the first throttling element 217, the first port 212*a* and second port 212*b* of the first three-way valve 212, and the regulating valve 215, and to turn off the second throttling element 218 and the third port 212*c* of the first three-way valve 212, so that the first throttling element 217 plays a throttling role; and the controller instructs to turn on the first port 223*a* and the third port 223*c* of the second three-way valve 223, and to turn off the second port 223*b* of the second three-way valve 223.

On the air conditioning system side, the refrigerant of the air conditioning system 210 first enters the compressor 211 to achieve gas-phase compression. Then, the refrigerant flows from the exhaust port 211*a* of the compressor 211 through the first port 212*a* of the first three-way valve 212 and the second port 212*b* of the first three-way valve 212 into the first outdoor heat exchanger 213 for condensation and heat dissipation. The refrigerant then flows through the first throttling element 217 into the indoor heat exchanger 214, where the refrigerant can enter the indoor heat exchanger 214 for evaporation and heat absorption after undergoing throttling expansion in the first throttling element 217, thereby providing cooling for the compartment. When the refrigerant returns to the suction port 211*b* of the compressor 211 after passing through the regulating valve 215, the cycle is completed.

On the battery cooling system side, the coolant of the battery cooling system 220 flows from the outlet 222*a* of the battery cooling device 222 through the first port 223*a* of the second three-way valve 223 and the third port 223*c* of the second three-way valve 223 into the second outdoor heat exchanger 221, thereby achieving heat exchange between the coolant and air through air cooling and other means, thus further reducing the temperature of the coolant. Subsequently, the coolant that has undergone heat exchange returns to the inlet 222*b* of the battery cooling device 222, thereby cooling the battery cooling device 222, thus completing the cycle.

In addition, although not shown in the figures, an embodiment of a transportation refrigeration vehicle is also provided here. The transportation refrigeration vehicle can be a new energy electric vehicle or a hybrid electric vehicle, and comprises a vehicle thermal management system in any of the aforementioned embodiments or combinations thereof. Therefore, it also has the corresponding technical effects, which will not be repeated here.

In the depiction of the present invention, it should be appreciated that the terms "first" and "second" are only used for descriptive purposes and cannot be construed as indicating or implying relative importance or implying the quantity of technical features indicated. Therefore, the features limited with "first" and "second" can explicitly or implicitly include at least one of these features. In the depiction of the present invention, "a plurality of" means at least two, such as two, three, etc., unless otherwise specified.

In the present invention, unless otherwise specified and limited, the terms "connect", "communicate" and other terms should be interpreted in a broad sense, which can be, for example, a fixed connection, a detachable connection, or integrally formed; or can be a direct connection or an indirect connection through an intermediate medium; or can be an internal connection of two components or the interaction relationship between two components, unless otherwise specified. For those skilled in the art, the specific meanings of the above terms in the present invention can be interpreted based on specific circumstances.

The above examples mainly illustrate a vehicle thermal management system and a transportation refrigeration vehicle of the present invention. Although only some embodiments of the present invention have been described, those skilled in the art should be aware that the present invention can be implemented in many other forms without deviating from its main idea and scope. Therefore, the examples and embodiments illustrated are considered as illustrative rather than restrictive. Without departing from the spirit and scope of the present invention as defined in the appended claims, the present invention may encompass various modifications and substitutions.

What is claimed is:

1. A vehicle thermal management system, comprising:

an air conditioning system, configured with a compressor, a first three-way valve, a first outdoor heat exchanger, an indoor heat exchanger, a regulating valve, an intermediate heat exchanger, and a first throttling element, a second throttling element, and a third throttling element connected through pipelines, wherein, the first three-way valve has a first port for communicating with an exhaust port of the compressor, a second port for communicating with a first end of the first outdoor heat exchanger, and a third port for communicating with a first end of the indoor heat exchanger; a second end of the first outdoor heat exchanger is connected to the first end of the indoor heat exchanger through the first throttling element, and the second end of the first outdoor heat exchanger is connected to a suction port of the compressor through the second throttling element and the intermediate heat exchanger; a second end of the indoor heat exchanger is connected to the suction port of the compressor through the regulating valve, and the second end of the indoor heat exchanger is connected to the suction port of the compressor through the third throttling element and the intermediate heat exchanger; and a battery cooling system, configured with a second outdoor heat exchanger, a battery cooling device, and a second three-way valve connected through pipelines, wherein, the second three-way valve has a first port for communicating with an outlet of the battery cooling device, a second port for communicating with the intermediate heat exchanger, and a third port for communicating with a first end of the second outdoor heat exchanger; an inlet of the battery cooling device and a second end of the second outdoor heat exchanger are simultaneously connected to the intermediate heat exchanger.

2. The vehicle thermal management system according to claim 1, wherein the regulating valve is a stepless regulating valve.

3. The vehicle thermal management system according to claim 2, wherein the vehicle thermal management system comprises a controller that communicates with the regulating valve, the first throttling element, the second throttling element, the third throttling element, or any combination thereof.

4. The vehicle thermal management system according to claim 3, comprising:

a compartment cooling and battery cooling mode, wherein, the controller instructs to turn on the first throttling element, the second throttling element, the first port and second port of the first three-way valve, and the regulating valve, and to turn off the third throttling element, and the third port of the first three-way valve, so that the first throttling element and the second throttling element play a throttling role, thereby allowing a first part of refrigerant of the air conditioning system to sequentially flow through the exhaust port of the compressor, the first port of the first three-way valve, the second port of the first three-way valve, the first outdoor heat exchanger, the first throttling element, the indoor heat exchanger, the regulating valve and the suction port of the compressor, and at the same time allowing a second part of the refrigerant of the air conditioning system to sequentially flow through the exhaust port of the compressor, the first port of the first three-way valve, the second port of the first three-way valve, the first outdoor heat exchanger, the second throttling element, the intermediate heat exchanger, and the suction port of the compressor; and the controller instructs to turn on the first port and second port of the second three-way valve, and to turn off the third port of the second three-way valve, so that the coolant of the battery cooling system sequentially flows through the outlet of the battery cooling device, the first port of the second three-way valve, the second port of the second three-way valve, the intermediate heat exchanger, and the inlet of the battery cooling device.

5. The vehicle thermal management system according to claim 3, comprising:

a compartment heating and battery cooling mode, wherein, the controller instructs to turn on the third throttling element, the first port and third port of the first three-way valve, and to turn off the first throttling element, the second throttling element, the second port of the first three-way valve, and the regulating valve, so that the third throttling element plays a throttling role, thereby allowing the refrigerant of the air conditioning system to sequentially flow through the exhaust port of the compressor, the first port of the first three-way valve, the third port of the first three-way valve, the indoor heat exchanger, the third throttling element, the intermediate heat exchanger, and the suction port of the compressor; and the controller instructs to turn on the first port and second port of the second three-way valve, and to turn off the third port of the second three-way valve, so that the coolant of the battery cooling system sequentially flows through the outlet of the battery cooling device, the first port of the second three-way valve, the second port of the second three-way valve, the intermediate heat exchanger, and the inlet of the battery cooling device.

6. The vehicle thermal management system according to claim 3, comprising:

a compartment cooling and battery natural cooling mode, wherein, the controller instructs to turn on the first throttling element, the first port and second port of the first three-way valve, and the regulating valve, and to turn off the second throttling element, the third throttling element, and the third port of the first three-way valve, so that the first throttling element plays a throttling role, thereby allowing the refrigerant of the air conditioning system to sequentially flow through the exhaust port of the compressor, the first port of the first three-way valve, the second port of the first three-way valve, the first outdoor heat exchanger, the first throttling element, the indoor heat exchanger, the regulating valve and the suction port of the compressor; and the controller instructs to turn on the first port and third port of the second three-way valve, and to turn off the second port of the second three-way valve, so that the coolant of the battery cooling system sequentially flows through the outlet of the battery cooling device, the first port of the second three-way valve, the third port of the second three-way valve, the second outdoor heat exchanger, and the inlet of the battery cooling device.

7. A vehicle thermal management system, comprising:

an air conditioning system, configured with a compressor, a first three-way valve, a first outdoor heat exchanger, an indoor heat exchanger, a regulating valve, an intermediate heat exchanger, a first one-way valve, a second one-way valve, and a first throttling element and a second throttling element connected through pipelines, wherein, the first three-way valve has a first port for communicating with an exhaust port of the compressor, a second port for communicating with a first end of the first outdoor heat exchanger, and a third port for communicating with a first end of the indoor heat exchanger; a second end of the first outdoor heat exchanger is connected to the first end of the indoor heat exchanger through the first throttling element, and at the same time, the second end of the first outdoor heat exchanger is connected to a suction port of the compressor through the first one-way valve, the second throttling element, and the intermediate heat exchanger; a second end of the indoor heat exchanger is connected to the suction port of the compressor through the regulating valve, and at the same time the second end of the indoor heat exchanger is connected to the suction port of the compressor through the second one-way valve, the second throttling element, and the intermediate heat exchanger; and a battery cooling system, configured with a second outdoor heat exchanger, a battery cooling device, and a second three-way valve connected through pipelines, wherein, the second three-way valve has a first port for communicating with an outlet of the battery cooling device, a second port for communicating with the intermediate heat exchanger, and a third port for communicating with a first end of the second outdoor heat exchanger; an inlet of the battery cooling device and a second end of the second outdoor heat exchanger are simultaneously connected to the intermediate heat exchanger.

8. The vehicle thermal management system according to claim 7, wherein the regulating valve is a stepless regulating valve.

9. The vehicle thermal management system according to claim 8, wherein the vehicle thermal management system comprises a controller that communicates with the regulating valve, the first throttling element, the second throttling element, or any combination thereof.

10. The vehicle thermal management system according to claim 9, comprising:

a compartment cooling and battery cooling mode, wherein, the controller instructs to turn on the first throttling element, the second throttling element, the first port and second port of the first three-way valve, and the regulating valve, and to turn off the third port of the first three-way valve, so that the first throttling element and the second throttling element play a throttling role, thereby allowing a first part of refrigerant of the air conditioning system to sequentially flow through the exhaust port of the compressor, the first port of the first three-way valve, the second port of the first three-way valve, the first outdoor heat exchanger, the first throttling element, the indoor heat exchanger, the regulating valve, and the suction port of the compressor, and at the same time allowing a second part of the refrigerant of the air conditioning system to sequentially flow through the exhaust port of the compressor, the first port of the first three-way valve, the second port of the first three-way valve, the first outdoor heat exchanger, the first one-way valve, the second throttling element, the intermediate heat exchanger, and the suction port of the compressor; and the controller instructs to turn on the first port and the second port of the second three-way valve, and turn off the third port of the second three-way valve, so that coolant of the battery cooling system sequentially flows through the outlet of the battery cooling device, the first port of the second three-way valve, the second port of the second three-way valve, the intermediate heat exchanger, and the inlet of the battery cooling device.

11. The vehicle thermal management system according to claim 9, comprising:

a compartment heating and battery cooling mode, wherein, the controller instructs to turn on the second throttling element, the first port and third port of the first three-way valve, and to turn off the first throttling element, the second port of the first three-way valve, and the regulating valve, so that the second throttling element plays a throttling role, thereby allowing the refrigerant of the air conditioning system to sequentially flow through the exhaust port of the compressor, the first port of the first three-way valve, the third port of the first three-way valve, the indoor heat exchanger, the second one-way valve, the second throttling element, the intermediate heat exchanger, and the suction port of the compressor; and the controller instructs to turn on the first port and second port of the second three-way valve, and to turn off the third port of the second three-way valve, so that the coolant of the battery cooling system sequentially flows through the outlet of the battery cooling device, the first port of the second three-way valve, the second port of the second three-way valve, the intermediate heat exchanger, and the inlet of the battery cooling device.

12. The vehicle thermal management system according to claim 9, comprising:

a compartment cooling and battery natural cooling mode, wherein, the controller instructs to turn on the first throttling element, the first port and second port of the first three-way valve, and the regulating valve, and to turn off the second throttling element, and the third port of the first three-way valve, so that the first throttling element plays a throttling role, thereby allowing the refrigerant of the air conditioning system to sequentially flow through the exhaust port of the compressor, the first port of the first three-way valve, the second port of the first three-way valve, the first outdoor heat exchanger, the first throttling element, the indoor heat exchanger, the regulating valve and the suction port of the compressor; and the controller instructs to turn on the first port and third port of the second three-way valve, and turn off the second port of the second three-way valve, so that the coolant of the battery cooling system sequentially flows through the outlet of the battery cooling device, the first port of the second three-way valve, the third port of the second three-way valve, the second outdoor heat exchanger, and the inlet of the battery cooling device.

13. A transportation refrigeration vehicle, comprising: a vehicle thermal management system according to claim 7.

14. A vehicle thermal management system, comprising:

an air conditioning system comprising:

a compressor;

an outdoor heat exchanger;

an indoor heat exchanger;

an intermediate heat exchanger;

a three-way valve; and multiple throttling elements configured to regulate refrigerant flow, wherein the three-way valves and throttling elements are arranged such that refrigerant selectively flows between the compressor, the outdoor heat exchanger, the indoor heat exchanger, and the intermediate heat exchanger in multiple operating modes; and a battery cooling system comprising:

a battery cooling device and a second outdoor heat exchanger, wherein the battery cooling device and the second outdoor heat exchanger are each connected to the intermediate heat exchanger, and wherein the system is operable to selectively provide thermal exchange between the intermediate heat exchanger and at least one of the indoor heat exchanger or the battery cooling device by controlling at least one of the three-way valve or throttling elements.

15. The vehicle thermal management system of claim 14, wherein the air conditioning system further comprises a regulating valve fluidly coupled between the indoor heat exchanger and the compressor, and wherein the regulating valve is a stepless regulating valve.

16. The vehicle thermal management system of claim 14, wherein at least one of the throttling elements comprises a throttling valve having a shut-off function, and wherein a first throttling element is selectively fully closed while a second throttling element is modulated to regulate throttling expansion.

17. The vehicle thermal management system of claim 14, further comprising a controller communicatively coupled to at least one of the three-way valve or throttling elements, wherein the controller is configured to control refrigerant flow by selectively turning on/off at least one throttling element and selecting ports of at least one three-way valve.

18. The vehicle thermal management system of claim 17, wherein the controller is configured to implement a compartment cooling and battery cooling mode in which a first portion of refrigerant flows through the outdoor heat exchanger and indoor heat exchanger and a second portion of refrigerant flows through the outdoor heat exchanger and the intermediate heat exchanger to exchange heat with coolant of the battery cooling system.

19. The vehicle thermal management system of claim 17, wherein the controller is configured to implement a battery natural cooling mode in which coolant flows through the second outdoor heat exchanger and the battery cooling device, while bypassing the intermediate heat exchanger.

20. The vehicle thermal management system of claim 14, wherein the air conditioning system further comprises a first one-way valve and a second one-way valve arranged in refrigerant flow paths between the outdoor heat exchanger and the compressor suction to control flow through the intermediate heat exchanger in at least one operating mode.

* * * * *